United States Patent [19]

Picklesimer et al.

[11] 4,187,359

[45] Feb. 5, 1980

[54] ACETYLENE-TERMINATED POLYIMIDE COMPOSITIONS

[76] Inventors: Lewellyn G. Picklesimer, 3765 Winthrop Dr., Dayton, Ohio 45431; Michael A. Lucarelli, 175 Old Dayton Yellow Springs Rd., Fairborn, Ohio 45324; Theodore J. Reinhart, Jr., 345 Forrer Blvd., Dayton, Ohio 45419

[21] Appl. No.: 967,049

[22] Filed: Dec. 6, 1978

[51] Int. Cl.$^2$ ............................................. C08L 77/10
[52] U.S. Cl. .................................. 525/6; 260/45.9 K; 260/45.9 KA; 528/125; 528/434
[58] Field of Search ............... 526/6, 15, 52; 528/177, 528/178, 125; 260/45.9 K, 45.9 KA

[56] References Cited

U.S. PATENT DOCUMENTS

| | | | |
|---|---|---|---|
| 3,845,018 | 10/1974 | Bilow et al. | 528/178 |
| 3,864,309 | 2/1975 | Bilow et al. | 528/178 |
| 3,897,395 | 7/1975 | D'Alelio | 528/178 |
| 4,098,767 | 7/1978 | Bilow | 528/178 |

Primary Examiner—Lester L. Lee
Attorney, Agent, or Firm—Joseph E. Rusz; Cedric H. Kuhn

[57] ABSTRACT

A composition of matter comprising an acetylene-terminated polyimide oligomer and trinitriloacetonitrile. The composition has a retarded cure rate, thereby facilitating the fabrication of void-free molded objects and composites.

3 Claims, No Drawings

ACETYLENE-TERMINATED POLYIMIDE COMPOSITIONS

RIGHTS OF THE GOVERNMENT

The invention described herein may be manufactured and used by or for the Government of the United States for all governmental purposes without the payment of any royalty.

FIELD OF THE INVENTION

This invention relates to acetylene-terminated polyimide compositions which have a retarded rate of cure. In one aspect, it relates to a process for retarding the rate of cure of acetylene-terminated polyimide oligomers.

BACKGROUND OF THE INVENTION

Acetylene-terminated polyimide oligomers show promise as matrix resins for advanced aircraft and aerospace systems. The materials have the potential of curing without the evolution of volatile by-products, thereby obviating the problem of voids formation in composite structures and molded articles. Unfortunately, the acetylene-terminated oligomers generally display a very narrow processing window as a result of comparatively rapid gel formation at cure temperatures. For example, gel times of 1 to 3 minutes at cure temperatures of about 485° F. are not unusual. Because of the short flow period before gelation occurs, it becomes necessary to control processing parameters very closely, thereby raising a difficult problem in the fabrication of composites, adhesive bonded joints and molded components.

It is an object of this invention, therefore, to provide an additive for acetylene-terminated polyimide oligomers that retard their rate of cure.

Another object of the invention is to provide an acetylene-terminated polyimide oligomer composition having a retarded cure rate as compared to the oligomer per se.

Another object of the invention is to provide a method for retarding the rate of cure of acetylene-terminated polyimide oligomers.

Other objects and advantages of the invention will become apparent to those skilled in the art upon consideration of the accompanying disclosure.

SUMMARY OF THE INVENTION

The present invention resides in the discovery that the addition of a minor amount of trinitriloacetonitrile $[(N\equiv C-CH_2)_3N]$ to an acetylene-terminated polyimide oligomer inhibits or retards the rate of cure of the oligomer. Broadly speaking, the composition of this invention comprises a major amount of an acetylene-terminated polyimide oligomer and a minor amount of trinitriloacetonitrile. A preferred composition is one consisting essentially of the acetylene-terminated polyimide oligomer and about 1 to 20 weight percent of the additive, i.e., trinitriloacetonitrile, based upon the weight of the polyimide oligomer.

The composition of this invention is prepared by blending the polyimide oligomer and the additive, both of which are in solid form, so as to provide an intimate mixture of the materials. The mixing of small amounts is usually accomplished by grinding the materials in a mortar while mixing apparatus, such as a Banbury mixer, can be utilized to blend larger quantities. In a preferred procedure, the materials are added to acetone and then stirred until the acetone is evaporated. Intermittent stirring over a period of about 1 to 8 hours is usually sufficient to complete the evaporation and leave a homogeneous mixture of the polyimide oligomer and the additive.

Acetylene-terminated polyimide oligomers are well known materials that are described in the literature. While the present invention is applicable to acetylene-terminated polyimide oligomers generally, it is often preferred to utilize an oligomer having the following structural formula:

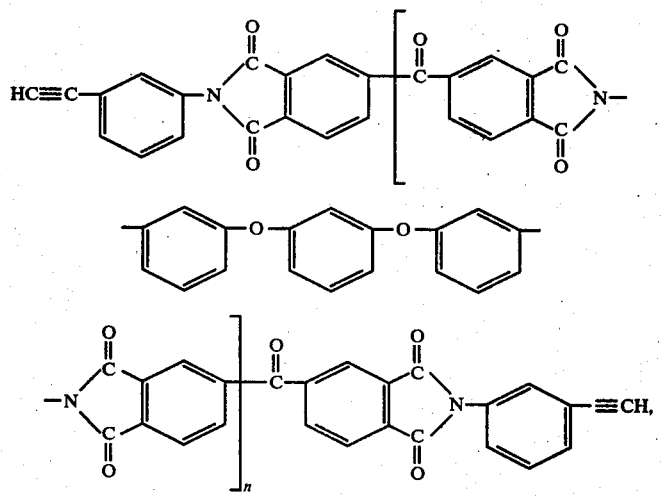

where n is 1 or 2.

The polyimide oligomers according to the foregoing formula are prepared as described in U.S. Pat. No. 3,845,018, issued to Bilow et al on Oct. 29, 1974. The oligomers are also disclosed in U.S. Pat. Nos. 3,864,309 and 3,879,349, which also issued to Bilow et al.

The composition of this invention is particularly useful in making objects or articles by compression molding. In a preferred molding procedure, the composition is placed in a mold and heated for 1 hour at 420° F.

under a pressure of 250 psi. During this period the composition is converted to a liquid state and remains in that state for about 10 to 15 minutes. By remaining in the liquid state, any residual solvent present in the polyimide oligomer and any air in the mold are able to escape, thereby preventing the formation of voids and cracks in the molded product. In contrast to this desirable result, when the acetylene-terminated polyimide oligomer per se is used as the molding material, the oligomer gels within about 1 to 3 minutes, entrapping any residual solvent and air. As a result, the molded article contains voids and cracks.

After the initial heating period at 420° F. under a pressure of 250 psi, the pressure is increased to 1500 psi and held at that pressure for 45 minutes. While still at a pressure of 1500 psi, the temperature is raised to 600° F. at the rate of 25° F. per 5 minute intervals. The temperature and pressure are maintained at 600° F. and 1500 psi for 45 minutes in postcuring the molded composition. The molded composition is then allowed to cool to room temperature while under a pressure of 1500 psi prior to its removal from the mold.

The composition of this invention can be employed in the fabrication of composite structures. In one procedure the composition is spread in measured amounts on successive layers of glass cloth. The multi-ply laminate is then molded under the conditions specified in the preceding paragraph. A molded composite free of voids is thereby obtained.

As intimated above, the present composition melts when initially heated at about 420° F. and remains in a fluid, flowable state for an extended period of time. This retardation in the rate of cure greatly extends the processing window of the polyimide oligomer, thereby facilitating the cure procedure and ensuring the production of a product free of voids and cracks. While it is not intended to limit the present invention to any particular theory, it is believed that at the lower temperature of about 420° F. the trinitriloacetonitrile forms a complex with the acetylene end groups of the polyimide oligomers. As a result, the acetylene groups are unable to react and the composition melts and remains in a fluid state. However, because of the instability of the complex at higher temperatures, the complex subsequently breaks down, freeing the acetylene end groups and permitting the polyimide oligomers to propagate and cure by addition reactions to form high molecular weight, thermally stable products.

A more comprehensive understanding of the invention can be obtained by referring to the following illustrative examples which are not intended, however, to be unduly limitative of the invention.

EXAMPLE I

A run was conducted in which a mixture of an acetylene-terminated polyimide oligomer and 10 weight percent trinitriloacetonitrile (NTAN), based upon the weight of the oligomer, was prepared. The polyimide oligomer used is a product of Gulf Chemicals Co. sold under the trademark Thermid 600 and having the structure shown by the formula on page 3 in which n equals 1. In preparing the mixture, the Thermid 600 oligomer and NTAN were ground in a mortar until an intimate admixture was obtained.

A sample of the mixture was placed on a hot plate whose temperature was then raised to 450° F. at a rate of about 10° F. per minute. The mixture melted and was fluid for about 10 minutes. After cooling the mixture was a glassy bead.

In a control run a sample of Thermid 600 oligomer was heated in the same manner as described in the preceding paragraph. The oligomer did not melt or flow but only assumed a darkened appearance.

EXAMPLE II

A run was carried out in which a sample of the mixture prepared as described in Example I was dropped on a hot plate that had been preheated to 450° F. The mixture melted upon contact with the hot plate and remained fluid for about 10 minutes.

In a control run, a sample of Thermid 600 oligomer was dropped on a hot plate as described in the preceding paragraph. The Thermid 600 oligomer melted and remained fluid for about 3 minutes.

EXAMPLE III

Runs were conducted in which $3''\times\frac{1}{2}''\times\frac{1}{4}''$ bar specimens were prepared by compression molding mixtures consisting of Thermid 600 oligomer and 10 and 20 weight percent NTAN. The mixtures were prepared by adding the materials to acetone and stirring the materials intermittently until the acetone had evaporated, leaving homogeneous mixtures. In preparing each specimen, 8.4 g of mixture was added to a mold which had been sprayed with a fluorocarbon release agent. A hydraulic press was preheated to 420° F. and the mold was placed in the press and held at 420° F. and 250 psi for 1.5 hours. The pressure was then increased to 1000 psi and held for 1 hour. The mold was then allowed to cool to room temperature while under a pressure of 1000 psi after which the specimen was removed from the mold.

The specimens prepared as described above had advanced to a high degree of cure and were free of voids and cracks. However, since the ends of the specimens were slightly uncured, it was decided to use an increased pressure in subsequent runs as exemplified by those described hereinafter in Example IV.

Control runs were conducted in which it was attempted to form bar specimens from Thermid 600 by following the procedure described above. The specimens obtained either had large voids and cracks or the oligomer did not even flow, i.e., formed clumps in the mold.

EXAMPLE IV

Runs were conducted in which intimate mixtures consisting of Thermid 600 oligomer and 5 weight percent NTAN and 10 weight percent NTAN were prepared, following the procedure described in Example III. The mixtures were used to prepare $3''\times\frac{1}{2}''\times\frac{1}{4}''$ bars specimens by compression molding. In preparing each specimen, 8.4 g of mixture was added to a mold which had been sprayed with a fluorocarbon release agent. A hydraulic press was preheated to 420° F. and the mold was placed in the press and heated for 1 hour at 420° F. and 250 psi. The pressure was then raised to 1500 psi and held at that pressure for 45 minutes. The temperature was then raised to 600° F. at the rate of 25° F. per 25 minute intervals. The temperature and pressure were held at 600° F. and 1500 psi for 45 minutes after which the specimen was allowed to cool to room temperature with the pressure remaining at 1500 psi. Thereafter, in each run the specimen was removed from the mold.

The specimens obtained in the runs were completely cured and were free of voids and cracks. The presence of the NTAN in the mixture allowed the oligomer to stay in the fluid state after melting, thereby making it possible to form a uniform specimen. In control runs using Thermid 600 alone, the oligomer set up as soon as it melted so that the specimens obtained were invariably of poor quality.

As seen from the foregoing, the composition of this invention can be used to fabricate molded objects which are free of voids and cracks. This desirable result is made possible by the presence in the mixture of trinitriloacetonitrile which retards the rate of cure so that the oligomer remains in the liquid state for an extended period of time. The curing procedure is thereby simplified, making it possible to use lower pressures and eliminate the requirement of advancing the cure as is usually recommended for the polyimide oligomers.

As will be evident to those skilled in the art, modification of the present invention can be made in view of the foregoing disclosure without departing from the spirit and scope of the invention.

We claim:

1. A composition of matter comprising a major amount of an acetylene-terminated polyimide oligomer and a minor amount of trinitriloacetonitrile.

2. The composition of claim 1 which comprises the acetylene-terminated polyimide oligomer and about 1 to 20 weight percent of the trinitriloacetonitrile.

3. The composition according to claim 2 in which the acetylene-terminated polyimide oligomer has the following structural formula:

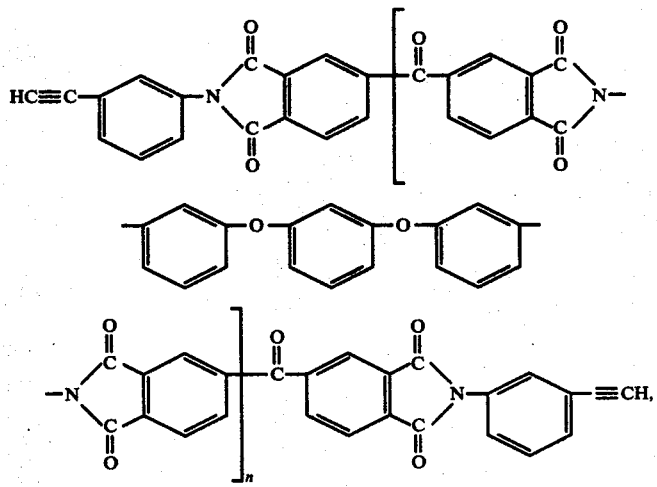

where n is 1 or 2.

UNITED STATES PATENT AND TRADEMARK OFFICE
CERTIFICATE OF CORRECTION

PATENT NO. : 4,187,359

DATED : February 5, 1980

INVENTOR(S) : Lewellyn G. Picklesimer, Michael A. Lucarelli and Theodore J. Reinhart, Jr.

It is certified that error appears in the above-identified patent and that said Letters Patent are hereby corrected as shown below:

Col. 2, line 53, change termination of formula from "-≡CH" to -- -C≡CH --. Col. 6, line 30, change termination of formula from "-≡CH" to -- -C≡CH --.

Signed and Sealed this

Twelfth Day of August 1980

[SEAL]

*Attest:*

SIDNEY A. DIAMOND

*Attesting Officer*

*Commissioner of Patents and Trademarks*